US009690301B2

(12) United States Patent
Mudd et al.

(10) Patent No.: US 9,690,301 B2
(45) Date of Patent: Jun. 27, 2017

(54) PRESSURE BASED MASS FLOW CONTROLLER

(71) Applicant: Reno Technologies, Inc., Wilmington, DE (US)

(72) Inventors: Daniel T. Mudd, Reno, NV (US); Patti J Mudd, Reno, NV (US)

(73) Assignee: Reno Technologies, Inc.

( * ) Notice: Subject to any disclaimer, the term of this patent is extended or adjusted under 35 U.S.C. 154(b) by 534 days.

(21) Appl. No.: 14/022,165

(22) Filed: Sep. 9, 2013

(65) Prior Publication Data
US 2014/0069527 A1    Mar. 13, 2014

Related U.S. Application Data

(60) Provisional application No. 61/743,748, filed on Sep. 10, 2012.

(51) Int. Cl.
F16K 31/12 (2006.01)
G05D 7/06 (2006.01)

(52) U.S. Cl.
CPC ........ G05D 7/0635 (2013.01); Y10T 137/776 (2015.04)

(58) Field of Classification Search
CPC  G05D 7/0635; G05D 7/0641; Y10T 137/776; Y10T 137/7761; Y10T 137/7764; G01F 1/86; G01F 1/88
See application file for complete search history.

(56) References Cited

U.S. PATENT DOCUMENTS

| 2,666,297 | A | 1/1954 | Skousgaard |
| 3,271,994 | A | 9/1966 | Fournier et al. |
| 3,335,748 | A | 8/1967 | Klemm et al. |
| 3,453,861 | A | 7/1969 | Levasseur |
| 3,491,946 | A | 1/1970 | Muller |
| 3,504,692 | A | 4/1970 | Goldstein |
| 3,559,482 | A | 2/1971 | Baker et al. |
| 3,570,807 | A | 3/1971 | Sturman et al. |
| 3,807,456 | A | 4/1974 | Colletti |

(Continued)

FOREIGN PATENT DOCUMENTS

| CN | 1816733 | 8/2006 |
| CN | 102354228 | 2/2012 |

(Continued)

OTHER PUBLICATIONS

Corresponding Taiwan Search Report dated Jan. 23, 2017.

Primary Examiner — Jessica Cahill
(74) Attorney, Agent, or Firm — The Belles Group, P.C.

(57) ABSTRACT

A mass flow controller (MFC) has a standard envelope with an enclosure and a corresponding base. A pressure transducer is communicatively coupled to a process gas in a proportional inlet valve without being physically coupled to the base. The space formerly occupied by the pressure transducer is available for additional component integration, or reduction of the standard envelope size. A second pressure transducer is located remotely and shared by multiple MFCs. A relief valve can quickly relieve a P1 pressure of a P1 volume of process gas. A first laminar flow element (LFE) and a second LFE and in series high conductance valve configured in parallel to produce a wide-range MFC that maintains accuracy.

15 Claims, 10 Drawing Sheets

(56) References Cited

U.S. PATENT DOCUMENTS

| | | | |
|---|---|---|---|
| 3,814,541 A | 6/1974 | Dent et al. | |
| 4,304,263 A | 12/1981 | Choate | |
| 5,044,199 A | 9/1991 | Drexel et al. | |
| 5,259,243 A | 11/1993 | Drexel et al. | |
| 5,285,673 A | 2/1994 | Drexel et al. | |
| 5,305,638 A | 4/1994 | Saghatchi et al. | |
| 5,321,992 A | 6/1994 | Mudd et al. | |
| 5,359,878 A | 11/1994 | Mudd | |
| 5,439,026 A | 8/1995 | Moriya et al. | |
| 5,762,086 A | 6/1998 | Ollivier | |
| 6,015,590 A | 1/2000 | Suntola | |
| 6,026,834 A * | 2/2000 | Azima | G05D 7/0635 137/1 |
| 6,116,269 A * | 9/2000 | Maxson | F04B 27/1804 137/487.5 |
| 6,152,162 A | 11/2000 | Balazy et al. | |
| 6,303,501 B1 | 10/2001 | Chen et al. | |
| 6,422,256 B1 | 7/2002 | Balazy et al. | |
| 6,443,174 B2 | 9/2002 | Mudd | |
| 6,539,968 B1 * | 4/2003 | White | G05D 7/0635 137/10 |
| 6,561,218 B2 | 5/2003 | Mudd | |
| 6,799,603 B1 | 10/2004 | Moore | |
| 6,832,628 B2 | 12/2004 | Thordarson et al. | |
| 6,881,263 B2 | 4/2005 | Lindfors et al. | |
| 7,037,372 B2 | 5/2006 | Lindfors et al. | |
| 7,252,032 B2 | 8/2007 | Scheffel et al. | |
| 7,334,602 B2 | 2/2008 | Ahn | |
| 7,337,805 B2 | 3/2008 | Brown et al. | |
| 7,370,664 B2 | 5/2008 | Glite | |
| 7,431,045 B2 | 10/2008 | Mudd et al. | |
| 7,552,015 B2 | 6/2009 | Shajii et al. | |
| 7,662,233 B2 | 2/2010 | Sneh | |
| 7,682,946 B2 | 3/2010 | Ma et al. | |
| 7,717,061 B2 | 5/2010 | Ishizaka et al. | |
| 7,850,779 B2 | 12/2010 | Ma et al. | |
| 7,922,150 B2 | 4/2011 | Cripps et al. | |
| 7,974,544 B2 | 7/2011 | Kobayashi | |
| 8,100,382 B2 | 1/2012 | Robertson, III et al. | |
| 8,183,781 B2 | 5/2012 | Sangam | |
| 8,282,992 B2 | 10/2012 | Myo et al. | |
| 8,291,857 B2 | 10/2012 | Lam et al. | |
| 8,293,015 B2 | 10/2012 | Lam et al. | |
| 8,340,827 B2 | 12/2012 | Yun et al. | |
| 8,343,279 B2 | 1/2013 | Myo et al. | |
| 8,376,312 B2 | 2/2013 | Mudd et al. | |
| 8,382,897 B2 | 2/2013 | Sangam | |
| 8,408,245 B2 | 4/2013 | Feldman et al. | |
| 8,460,753 B2 | 6/2013 | Xiao et al. | |
| 8,505,478 B2 | 8/2013 | Suekane et al. | |
| 8,511,337 B2 | 8/2013 | Nishimura | |
| 8,573,247 B2 * | 11/2013 | Ushigusa | G01F 1/36 137/486 |
| 8,770,215 B1 | 7/2014 | Mudd et al. | |
| 9,188,989 B1 | 11/2015 | Mudd et al. | |
| 2002/0002996 A1 | 1/2002 | Mudd | |
| 2002/0014206 A1 | 2/2002 | Mudd | |
| 2002/0046612 A1 | 4/2002 | Mudd | |
| 2002/0095225 A1 | 7/2002 | Huang et al. | |
| 2004/0007180 A1 | 1/2004 | Yamasaki et al. | |
| 2004/0083807 A1 | 5/2004 | Mudd et al. | |
| 2005/0056211 A1 | 3/2005 | Lindfors et al. | |
| 2006/0005883 A1 | 1/2006 | Mudd et al. | |
| 2006/0037644 A1 * | 2/2006 | Nishikawa | G05D 7/0641 137/487.5 |
| 2007/0089789 A1 * | 4/2007 | Mudd | G01F 1/86 137/487.5 |
| 2007/0227659 A1 | 10/2007 | Iizuka | |
| 2008/0041481 A1 | 2/2008 | Mudd et al. | |
| 2009/0101217 A1 * | 4/2009 | Ushigusa | G01F 1/36 137/511 |
| 2010/0138051 A1 | 6/2010 | Glime | |
| 2011/0108126 A1 | 5/2011 | Monkowski et al. | |
| 2012/0318383 A1 * | 12/2012 | Yasuda | G05D 7/0635 137/455 |
| 2013/0118596 A1 | 5/2013 | Horsky | |
| 2014/0230915 A1 | 8/2014 | Mudd et al. | |
| 2016/0011604 A1 | 1/2016 | Mudd et al. | |
| 2016/0018828 A1 | 1/2016 | Mudd et al. | |
| 2016/0041564 A1 | 2/2016 | Mudd et al. | |

FOREIGN PATENT DOCUMENTS

| | | |
|---|---|---|
| CN | 103838261 | 6/2014 |
| DE | 69535683 | 1/2009 |
| EP | 0468793 | 1/1992 |
| EP | 0671484 | 9/1995 |
| EP | 0689040 | 12/1995 |
| TW | 201414990 | 4/2014 |
| WO | 8700267 | 1/1987 |
| WO | 2011040409 | 4/2011 |

* cited by examiner

PRESSURE BASED MASS FLOW CONTROLLER

CROSS-REFERENCE TO RELATED APPLICATIONS

This application claims the benefit of priority under 35 U.S.C. 119(e) to U.S. Application No. 61/743,748, filed Sep. 10, 2012, entitled PRESSURE BASED MASS FLOW CONTROLLER, by Daniel T. Mudd et al., the contents of which are hereby incorporated by reference in its entirety.

FIELD OF THE INVENTION

The invention relates generally to semiconductor processing, and more specifically, improved mass flow controllers (MFC).

BACKGROUND OF THE INVENTION

Mass flow control has been one of the key technologies in semiconductor chip fabrication for forty years. As the technology of chip making has improved so has the demand on the mass flow controller (MFC). Initially chip manufacturing processes were courser than today. Process steps were longer and focus was on the control of steady state flow accuracies and repeatability. One could divert the gas flow or wait to strike a plasma until the system had stabilized at steady state and little attention was paid to the transients that occurred at the turn on or off of the gas flow.

Problematically, as more refined manufacturing processes evolved with time, higher performance was needed from conventional thermal and pressure based MFCs. The stability and accuracies of the past devices were bottlenecking semiconductor fabrication process. Process step durations shortened to 5 second steps seen now verses 30 minutes process steps of the past. The relatively long transient time to change gas flow rates to the process once acceptable with the longer process steps is problematic with the shorter process steps. Further, MFCs are lagging to meet the demand for controlling gas flows over a wider flow range with more accuracy and less costly hardware.

The pressure based MFC was introduced in the last decade and is now overtaking the use of the thermal MFC in critical etch applications. In 2002, Fugasity introduced a pressure base MFC called the Criterion. The pressure based MFC was an improvement on the thermal MFC and hence was a commercial success. However, those same forces that pushed the development of the Criterion, the demand for improved performance and reduced price, are still pushing to improve the design of the pressure based MFC.

One of the issues common to thermal and pressure based MFCs is form factor. Space is very expensive in a modern semiconductor tool. The interface connecting the MFC to the other components in a gas box has been standardized by the industry to allow interchangeability of devices such as MFC and air operated shut off valve produce by a multiple different suppliers. The dominate interface standard in the industry is based on components being 1.1" wide. MFC's are 1.1" wide (28.6 mm) by 4.13" (105 mm) in length with porting and other geometry details as describe in the Semi F82-0304 specification. Similarly a second interface specification, Semi F84-0304, defines the interface geometry for air operated valve as being 1.1" wide by 1.1" in length square interface.

Independent of the device type or manufacturer the vast majority of components (air valves, filters, check valves, regulators, etc.) found in the gas box of a modern semiconductor fabrication tool will comply with the 1.1" square interface. MFC and Electronic regulators will fit the 1.1" X 4.13" rectangular interface.

These device interchangeability issues and the resulting interface standards have had the impact of preventing spontaneous component size reductions. About every 10 to 20 years the industry has seen a new smaller standard proposed and accepted, but in time periods between these adoptions, devices are, as a practical matter, forced to retain the external envelope defined by the standards.

However, internal device design improvements that allow smaller internal components, while not affecting the external envelope, have had the beneficial effect of allowing more instrumentation and functionality to be placed into the standard external envelope. For example a supply pressure transducer, typically a 1.1" square interface, had been traditionally place upstream of an MFC. Component size reduction of the pressure transducer and similar reduction in the MFC's internal components has allow the function of the supply pressure transducer to be integrated into the MFC thus eliminating the need for the 1.1" square interface formerly used by the pressure transducer.

What is needed is a robust MFC having various space-saving layouts that allows additional component integration within the standard envelope and which incorporates improved design, components and new functionalities to address the transient response issues and accuracy limitations inherent in the current devices. Additionally, a layout in an MFC allows for a smaller pressure based MFC package size that allow it to fit the smaller standard square interface envelope rather than requiring the larger rectangular interface that current MFCs require.

SUMMARY

The present invention addresses these shortcomings by providing a pressure based mass flow controller (MFC) device, and methods therein, with space saving layouts and improved functionalities.

In one embodiment, an MFC has a standard envelope with an enclosure and a corresponding base. A pressure transducer is communicatively coupled to a process gas in a proportional inlet valve without being physically coupled to the base. The space on the base, formerly occupied by the pressure transducer, is available for additional component integration. In one embodiment, a second pressure transducer is located remotely and shared by multiple MFCs.

In another embodiment, an envelope is smaller than the standards. A pressure transducer is communicatively coupled to a process gas in an inlet valve without being physically coupled to the base. In this case, the components are arranged to be more compact in view of space formerly occupied by the pressure transducer. While this shorter embodiment does not fit the larger current interface standards it is obvious that making a device larger is easier than making one smaller and the smaller device might be readily expanded to fit current applications or be adopted as the new future interface standard that is periodically adopted.

In an embodiment, an MFC utilizes a second pressure transducer that is remotely located downstream from the MFC.

In yet another embodiment, an MFC has a self-relieving P1 pressure.

In still another embodiment, an MFC has a first LFE and a second LFE configured in parallel to produce a wide-range MFC that maintains its accuracy over a range that previously required two separate MFCs.

Additionally, a mini IGS style MFC, which utilizes the smaller square interface currently used by air valve, can have a pressure transducer communicatively coupled to a process gas in a proportional inlet valve without being physically coupled to a base. Optionally, a venting orifice can be provided.

Advantageously, the MFC layout provides additional space on a standard MFC envelope, and the MFC layout allows a smaller MFC envelope.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

A mass flow controller (MFC) device, and methods therein, with various space saving layouts is described.

Figure 1:
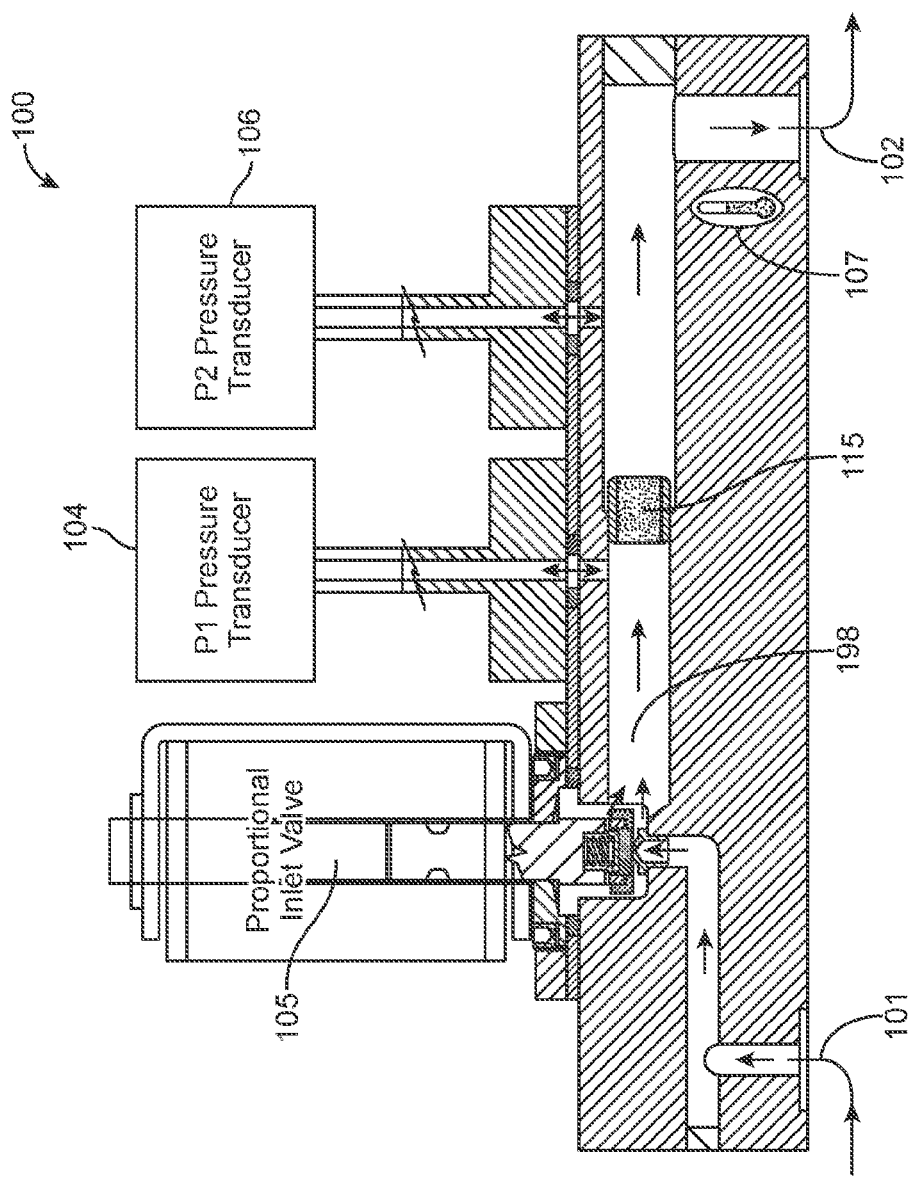
FIG. 1 is a schematic diagram illustrating a prior art layout of a pressure based mass flow controller (MFC) with a conventional P1 pressure transducer coupled to a base within a standard envelope, according to a prior art embodiment.

FIG. 1 is a schematic diagram illustrating a prior art layout of a pressure based mass flow controller (MFC) 100 with a conventionally-located P1 pressure transducer 104 coupled to a base 220 within a standard envelope, according to a prior art embodiment. One example of the prior art MFC 100 is the device manufactured by Fugasity. The prior art MFC 100 can be 4.13" long to fit industry standards. It consists of a proportional flow control valve 105 at an inlet 101 of the device, followed by the P1 pressure transducer 104 downstream of a proportional flow control valve 105, followed by a characterized laminar flow element (LFE) 115 acting as a flow restrictor, and a P2 pressure transducer 106 near the outlet 102 of the device. The prior art MFC 100 also utilizes a printed control board (PCB) (not shown) containing supporting electronics, software and calibration coefficient for receiving, pressure signals, a temperature signal (e.g., from a temperature sensor 107 embedded in the device) and an external set point indicating the target flow. Given these inputs the PCB drives a voltage to the proportional inlet valve 105 until sufficient pressure was achieved in the volume between a poppet of a valve and the downstream restrictor, to achieve the needed flow through the restrictor. This particular pressurized volume is referred to herein as a P1 volume 198. Under the conventional paradigm, the P1 pressure transducer 105 is coupled to the base in order to monitor the pressure of P1 volume 198.

Figure 2A:
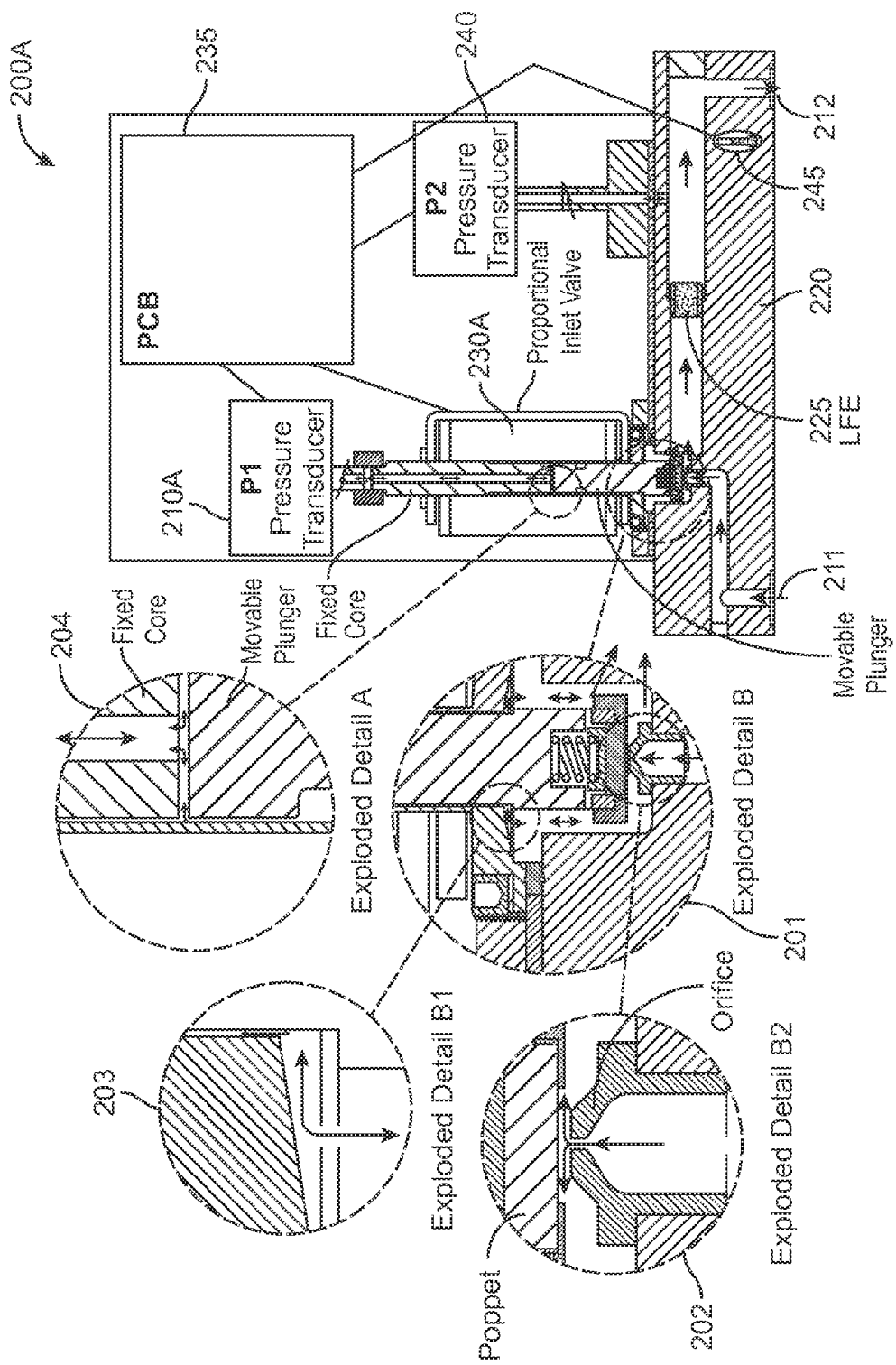
FIG. 2A is a schematic diagram illustrating a layout for a pressure based MFC with a P1 pressure transducer decoupled from a base for a smaller envelope, according to an embodiment.

FIG. 2A is a schematic diagram illustrating a layout for a pressure based MFC 200A with a P1 pressure transducer 210A decoupled from a base 220, according to an embodiment. Because the P1 pressure transducer 210A no longer occupies space on the base 220, the envelope can be reduced from the standard size of 4.13" or the freed up space on the base can be used to add additional components and functionality.

The inlet 211 of the MFC 200A receives a process gas into a conduit (e.g., an inlet conduit). Nitrogen is an exemplary process gas, but any suitable gas or fluid could be substituted. The conduit can be any suitable tubing, plumbing or machined block, either rigid or flexible. A KS1 substrate block (not shown) as manufactured by Hytron Corporation, serves as an interconnecting platform for the base 220 of the MFC 200A and other components for supplying gas to and receiving gas from the MFC 200A.

The proportional inlet valve 230A can be a solenoid or other appropriate component physically coupled to the base 220 to control gas flow through an inlet 211 of the MFC 200A. Process gas is received from the conduit (e.g., the inlet conduit) and sent back to the conduit after processing (e.g., the intermediate conduit). Rather than being directly connected to the base 220, the P1 pressure transducer 210 is communicatively coupled to monitor process gas internally downstream of from the valve seat and poppet of proportional inlet valve 230A. In some embodiments, the proportional inlet valve 230A has a movable portion and a fixed portion, and the P1 pressure transducer 210A is coupled to the fixed portion.

More specifically, the proportional inlet valve 230A has a solid upper pole rigidly attached to an outer tube, also rigidly attached to the base of the valve which is sealed to the base 220 of the MFC 200A. The mechanism contains the pressurized gas flowing through the proportional inlet valve 230A. Inside the outer tube a movable plunger is suspended via a radial spring. A conduit is bored through the fixed pole to communicate gas pressure to the P1 pressure transducer 210A attach to an end of the fixed pole, on top of the proportional inlet valve 230. As a result, the process gas and its associated pressure can communicate from the exits of the valve seat to the P1 pressure transducer 210A allowing the P1 pressure upstream of the restrictor to be sensed and controlled.

Details 201 and 204 are detail views showing the gas passages connecting the valve seat to the P1 pressure transducer 210. Detail 201 shows the small passages that contain gas from the valve seat to the movable plunger. Detail 202 illustrates the flow passage in the area of the movable plunger and orifice valve seat. Detail 203 shows the gas passage past the radial spring and into the small annular gap between the movable plunger and the lower details of the fixed outer tube assembly. Detail 204 illustrates the annular gap passage between the top section of the fixed outer tube assembly and the movable plunger and a second passage between the gap between the movable plunger and the fixed core where it enters the bore drilled through the length of the fixed plunger.

Although these passages are small, little flow is needed to pressurize or depressurize the small volume, hence, the pressure measured by the P1 pressure transducer 210 effectively represents the pressure at an outlet 212 of the valve seat and the inlet to the characterized restrictor.

A P2 pressure transducer 240 measures process gas in the conduit (e.g., outlet conduit) between an LFE 225 and the outlet 212. The outlet 212 delivers the process gas to a next conduit for eventual use by the process. In some embodiments, additional processing is performed on the process gas, such as mixing with other gases, or the like. A temperature sensor 245 provides temperature readings and a PCB 235 processes the temperature readings and other information in controlling the components on the MFC 200A.

Figure 8:
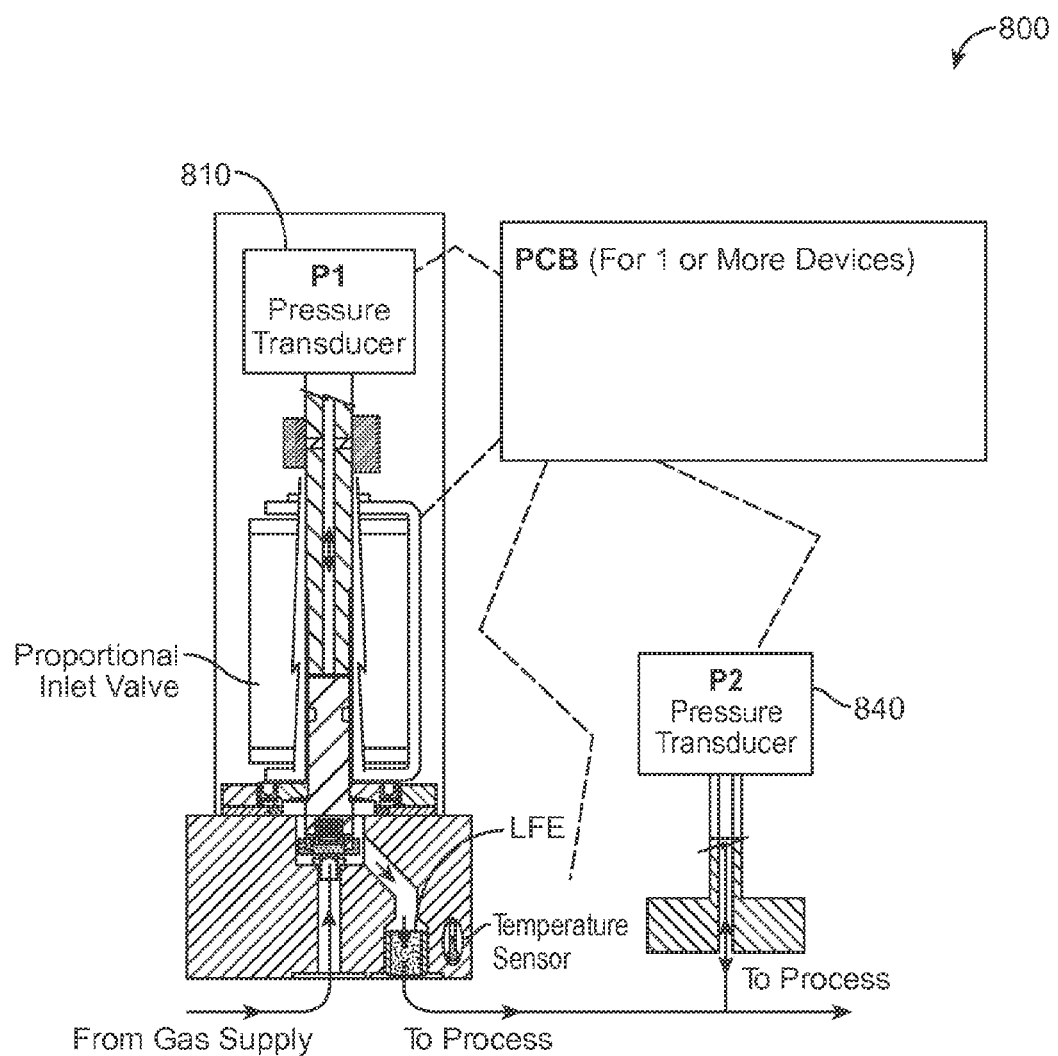
FIG. 8 is a layout for a schematic diagram illustrating a mini integrated gas system (IGS) with a P1 pressure transducer decoupled from the base, and a P2 pressure transducer remotely located, according to an embodiment.
Figure 9:
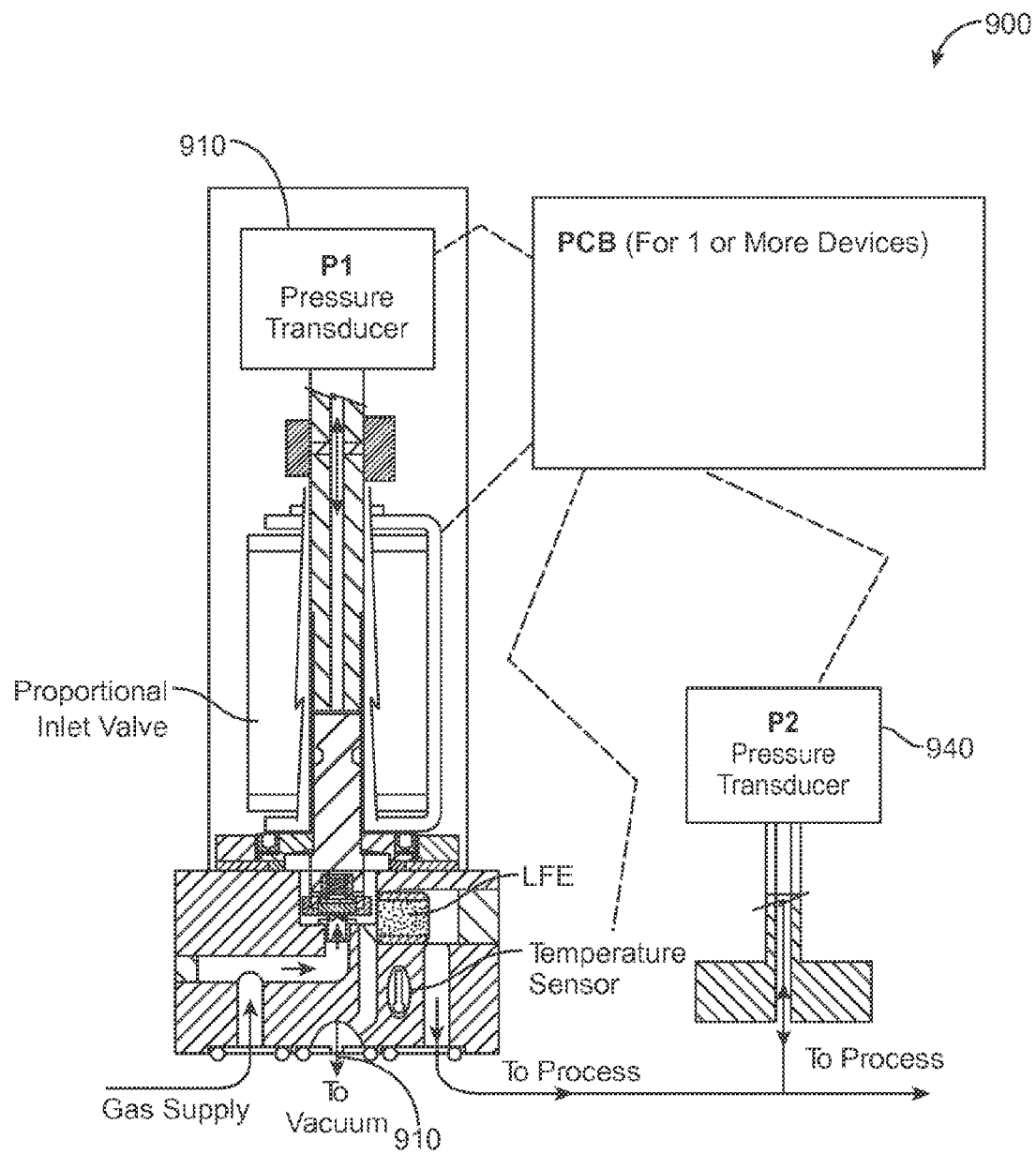
FIG. 9 is a layout for a schematic diagram illustrating a mini IGS with a P1 pressure transducer decoupled from a base, a venting orifice, and a P2 pressure transducer remotely-located, according to an embodiment.

In an embodiment of an IGS style MFC, due to arranging the P1 pressure transducer on top, the MFC functionality can be provided by a smaller envelope (e.g., see FIGS. 8 and 9). In more detail, rather than complying with the traditional interface standard of Semi F82-0304 for a rectangular-shaped interface having a 4.13" long base, the IGS style MFC can comply with the Semi F84-0304 standard for a square-shaped interface having a 1.1" base. Both standard are hereby incorporated by reference in their entirety.

Figure 2B:
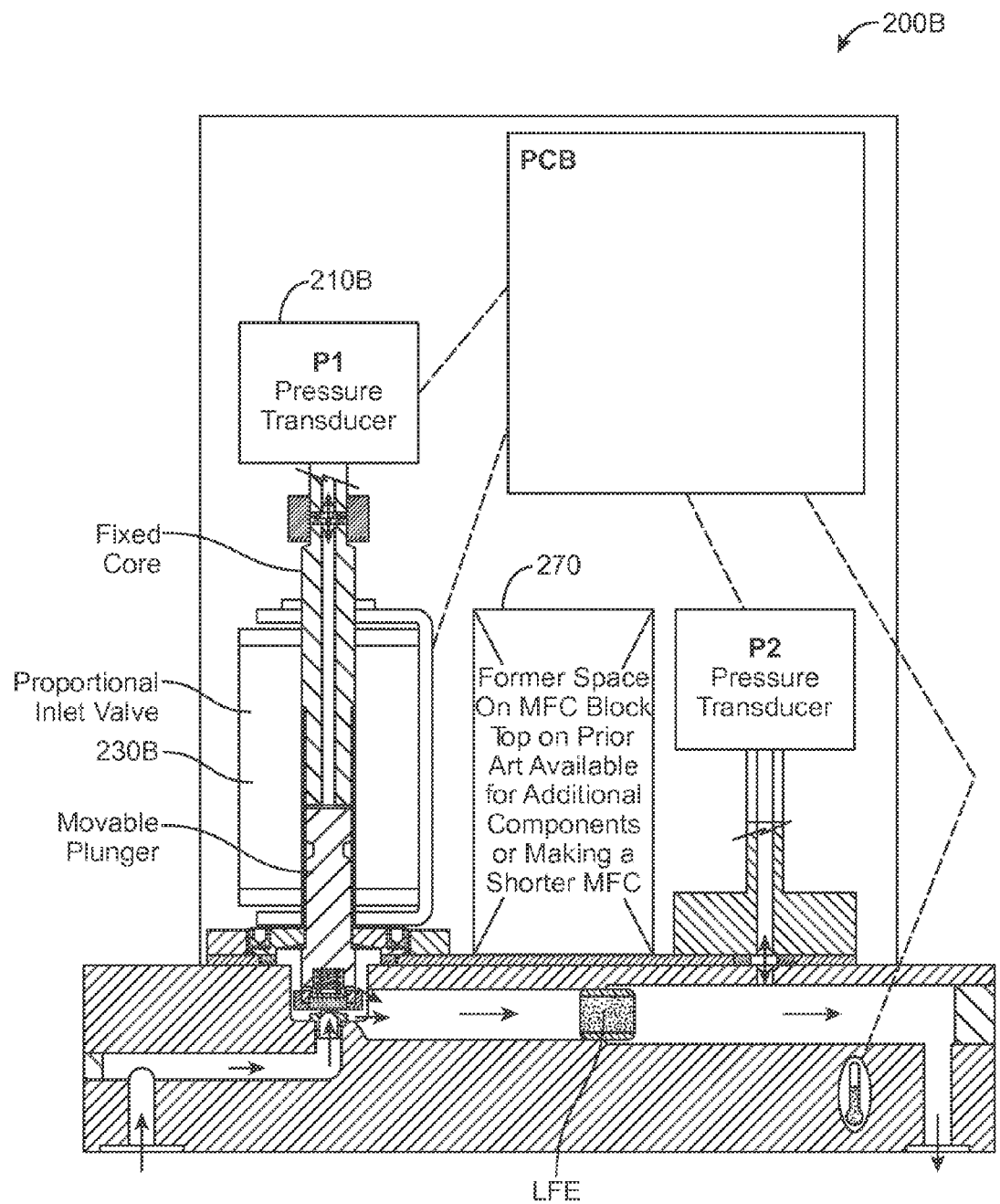
FIG. 2B is a schematic diagram illustrating a layout for a pressure based MFC with a P1 decoupled from the base and with space for an additional component to be coupled to a base within a standard envelope, according to an embodiment.

FIG. 2B is a schematic diagram illustrating a layout for a pressure based MFC 200B with a P1 pressure transducer 210B decoupled from the base over proportional inlet valve 230B and an additional component coupled to the base within a standard envelope, according to an embodiment.

Relative to FIG. 2A, the newly available real estate along the base of MFC 200B is utilized for integrating one or more additional components 270 within the standard size envelope rather than reducing the envelope (e.g., see FIGS. 3-7 for examples of additional components).

Figure 3:
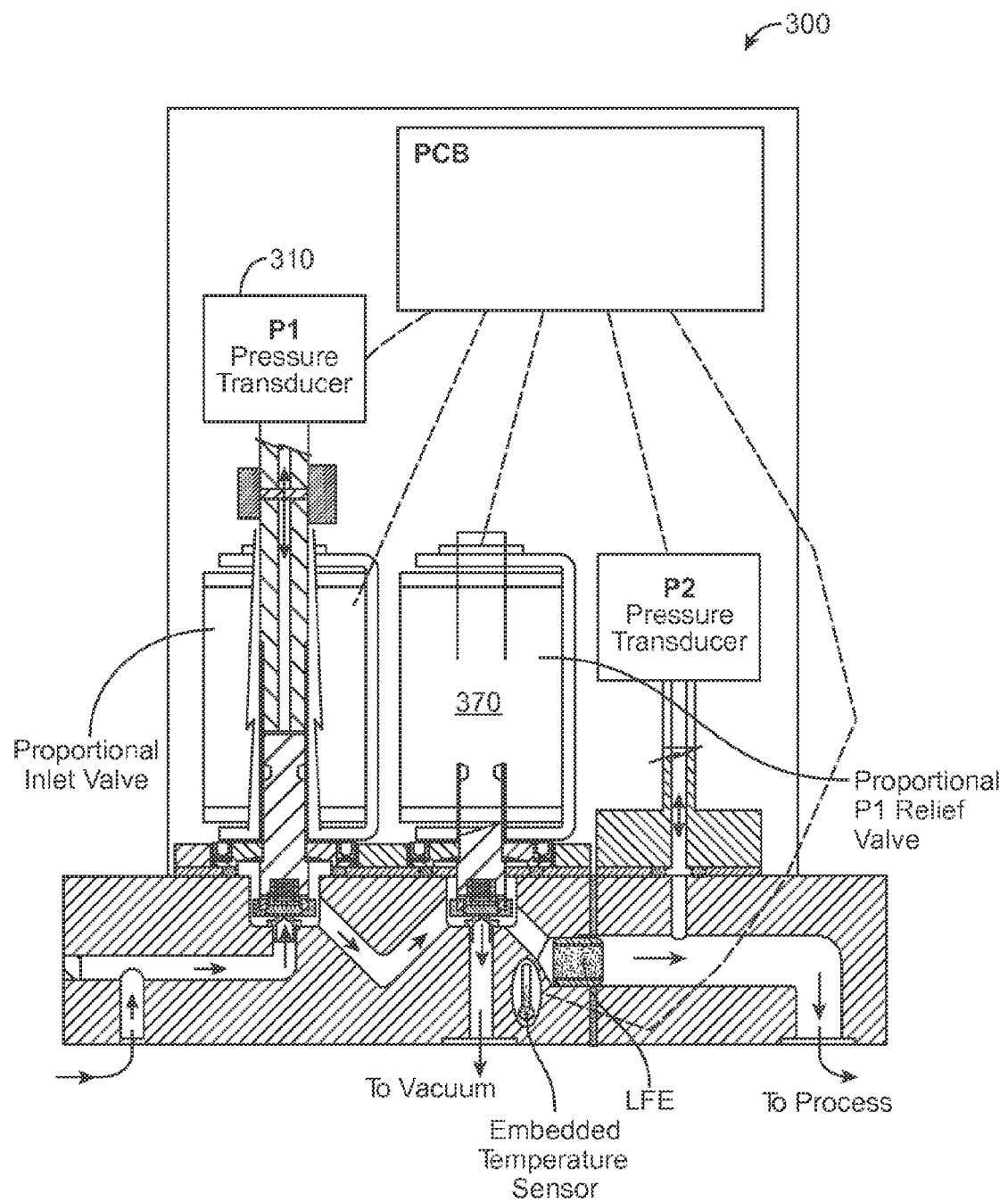
FIG. 3 is a schematic diagram illustrating a layout for a pressure based MFC with a P1 pressure transducer decoupled from A base and a relief valve coupled to the base for rapidly reducing the pressure upstream of the restrictor, to within a standard envelope, according to an embodiment.

FIG. 3 is a schematic diagram illustrating a layout for a pressure based MFC 300 with a P1 pressure transducer 310 decoupled from the base and a relief valve 370 coupled to the base within a standard envelope, according to an embodiment. Space for the relief valve 370 is enabled by the relocation of the P1 pressure transducer.

For MFCs having a small flow range, 500 sccm and below for example, the pressurized mass of gas between the valve seat of the proportional inlet valve and the inlet of the flow restrictor, the P1 volume, is significant compared to the desired flow rate to the process. Traditionally, when one gives the MFC a command to stop flow, via outputting a set point value of zero, the inlet proportional valve closes immediately but flow continues to bleed through the restrictor and to the process as the pressure in the P1 volume bleeds down to equalize with the pressure downstream of the restrictor. In the current pressure based MFC 300, the mass at P1 pressures that correspond to 100% full scale flow is roughly 1 to 2 standard cubic centimeters (i.e., 1 scc=1 cc of gas at 0 C and 1 atm). If the MFC is relatively large, say 1000 sccm at full scale, FS, (i.e., 1000 scc per minute) then the mass in the P1 volume is insignificant compared to the working flow rate and it bleeds off relatively quickly. However, flow rates below 1 sccm are now being requested. If the MFC is a 1 sccm FS device the P1 mass is very significant and the time constant of bleeding off the P1 mass is 1 minute. If the process is 5 seconds in length, then having an MFC that continues to flow gas to the process minutes after the command to stop flow, is not an acceptable situation. As a practical matter, the traditional mechanical full scale of pressure based MFC are limited to be above 250 sccm, to avoid this issue. Pressure based MFCs, which are built and labeled with full scales below this value, typically have the large 250 sccm laminar flow element restrictor but operate in the lower range operation by electronically or numerically scaling the flow calculation so that although the device is mechanically large its full scale reading is much smaller. The larger restrictor lowers the P1 pressure and bleeds down the P1 volume quicker, however this method induces larger device calibration drift.

The relief valve 370 of FIG. 3, by contrast, routes the P1 volume mass to a non-process abatements system via a vent or vacuum pump (also see FIGS. 4, 6, 7 and 9). In operation, a PCB controls a proportional valve controlled by a PCB. When it is desired to reduce the flow from the MFC 300 faster than the natural bleed down time constant of the bleed off through the restrictor to the process, the proportional P1 relief valve will open and control the P1 pressure to a lesser pressure. The lesser pressure can be controlled to quickly reduce to a lower flow rate or to stop flow. In the IGS 900 of FIG. 9, an orifice 910 replaces the proportional valve for cost and space savings. The orifice 910 is sized to bleed off a mass flow rate typically between 50 and 500 sccm (give a 1 cc P1 volume) to allow the speedy depressurization, relative to the intended process time, of the P1 area. It is noted that an on/off valve might be placed downstream and in series with the vent line if it is desired to reduce the quantity of gas vented. In this case continuous venting is avoided and gas is only vented when it is desired to reduce the P1 pressure.

Figure 4:
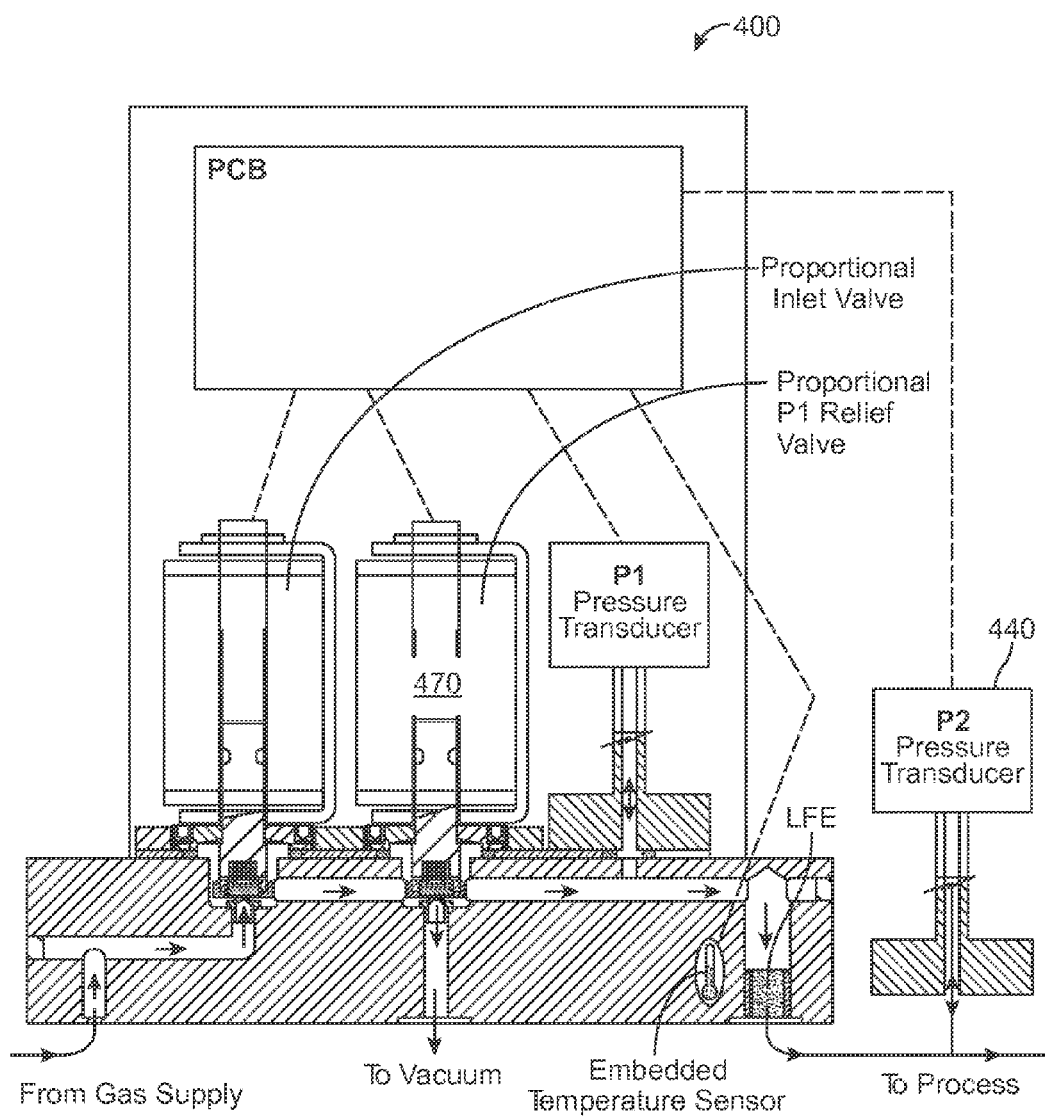
FIG. 4 is a schematic diagram illustrating a layout for a pressure based MFC with A P2 pressure transducer decoupled from a base and located remote to the envelope, and a relief valve coupled to the base, according to an embodiment.

FIG. 4 is a schematic diagram illustrating a layout for a pressure based MFC 400 with a P2 pressure transducer 440 decoupled from the base and located remote to the envelope, and a relief valve 470 coupled to the base, according to an embodiment.

The gas box of a modern semiconductor fabrication tool controls and mixes the flows of multiple gas species. Typically these gases combine at a common header connected to the exhaust of each of different gas sticks contain the different MFCs. Although there is typically a shut off air valve at the end of each MFC, its conductance is sufficiently high compared to the flow rate of the MFC that the pressure of the common header is sufficiently indicative of the P2 pressure seen by the individual MFCs when the shut off air valve is open and gas is flowing from the MFC. As a result, the P2 pressure information from a single pressure transducer located on this exhaust header (via analog or digital connections) can be shared with the PCBs of the individual MFCs to provide the P2 pressure information without the need for individual P2 pressure transducers located on each MFC. Optionally the P2 information may be read by the tool controller and sent electronically to the MFCs. In this layout, space is gained by removing the second pressure transducer allowing a smaller envelope or additional integrated components. Moreover, cost savings is realized because P2 pressure transducers are not needed on each MFC.

In one embodiment, as shown by FIGS. 8 and 9, the P2 pressure transducer 840, 940 can be located remotely to an IGS style MFC 800, 900. In other embodiments, the P1 pressure transducer 810, 910 can be placed on top of the proportional inlet valve as described herein. Furthermore, other embodiments can add a second LFE or a self-relieving valve.

Figure 5:
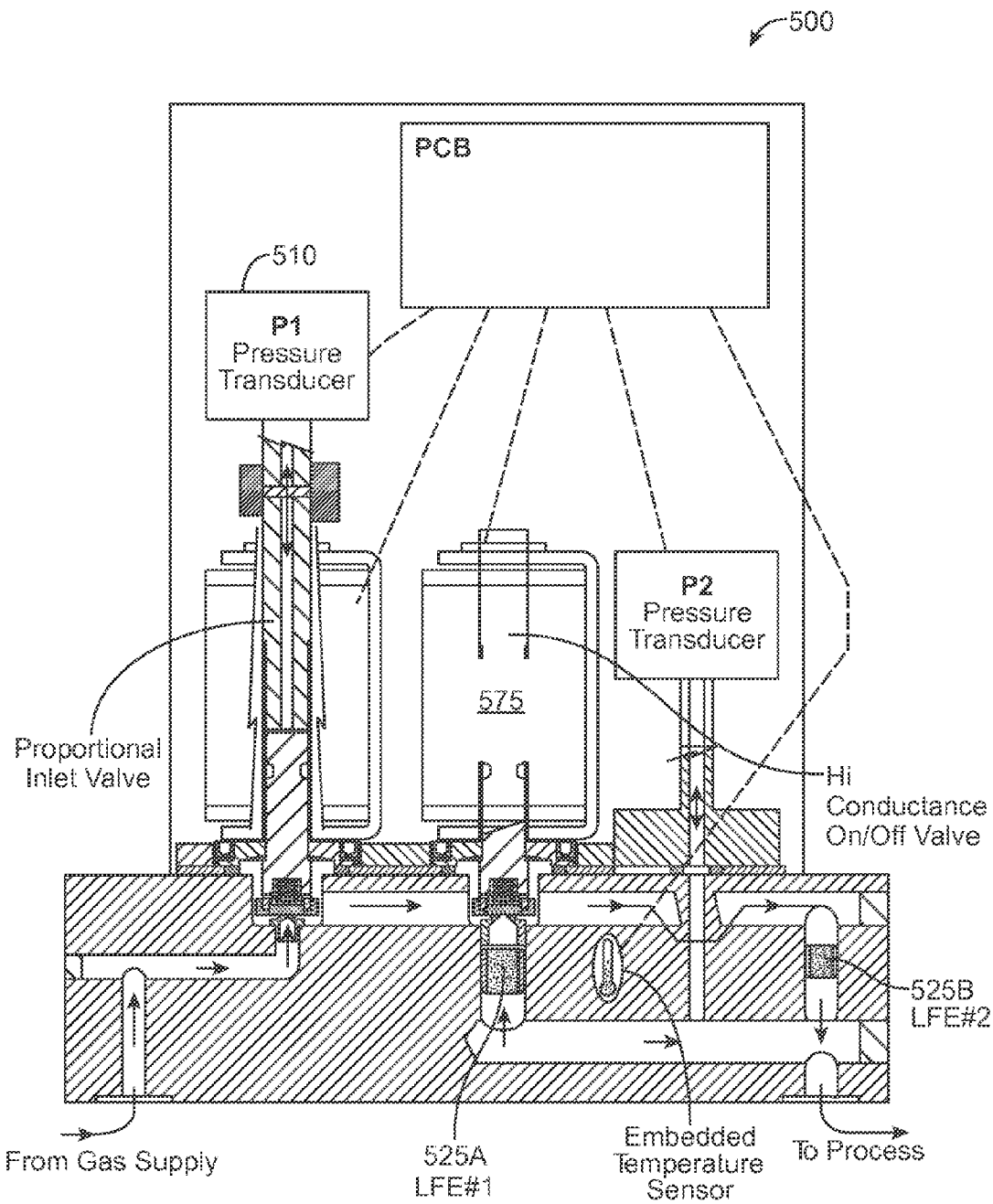
FIG. 5 is a schematic diagram illustrating a layout for a pressure based MFC with a P1 pressure transducer decoupled from a base and a second laminar flow element (LFE), which can be functionally active or inactive by the opening or closing of a high conductance valve in series with the LFE, according to an embodiment.
Figure 7:
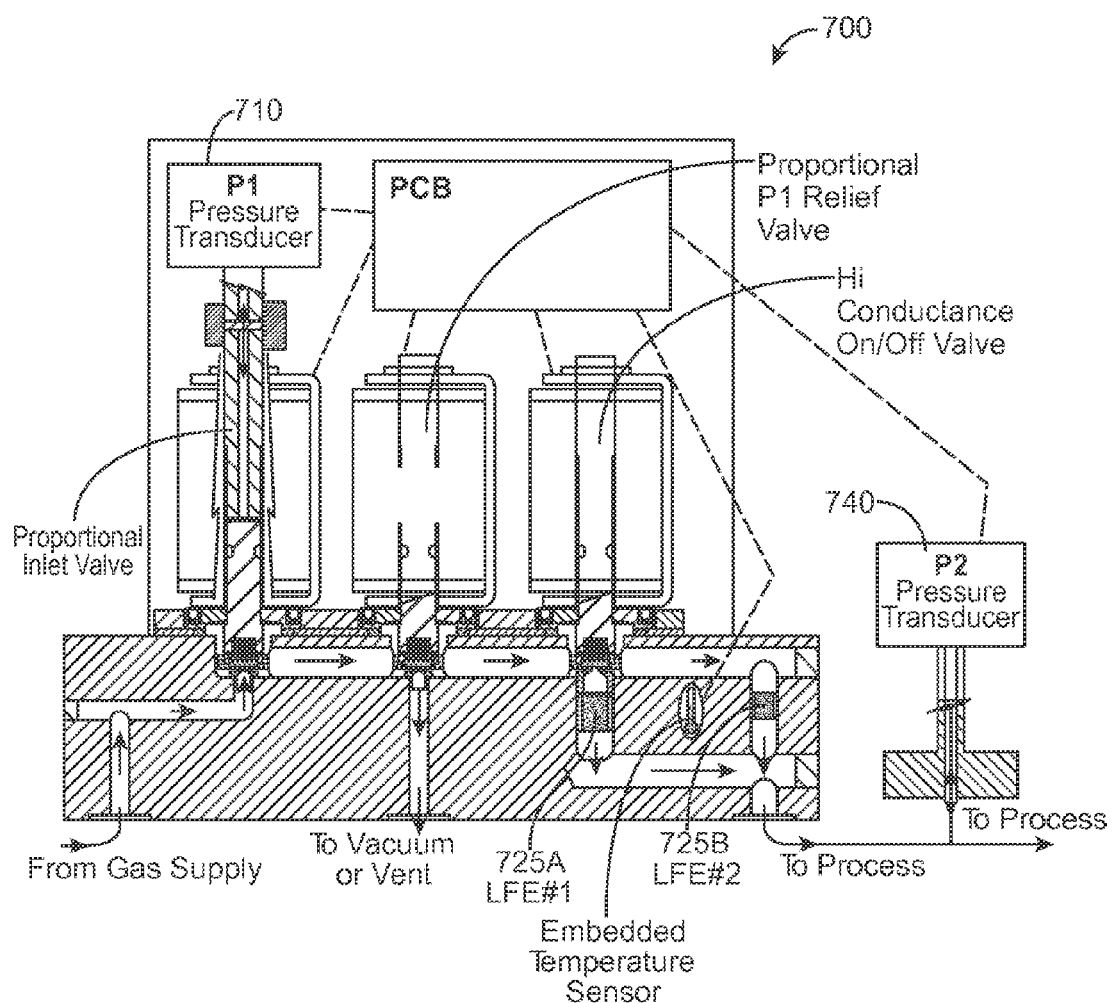
FIG. 7 is a schematic diagram illustrating a layout for a pressure based MFC with a P1 pressure transducer decoupled from a base and a second LFE, and a relief valve, and a P2 pressure transducer decoupled from the base and located remote to the envelope, according to some embodiments.

FIG. 5 is a schematic diagram illustrating a layout for a pressure based MFC 500 with a P1 pressure transducer 510 decoupled from the base and a second LFE 525B, according to an embodiment. In FIG. 7, the MFC with a P1 pressure transducer 710 decoupled from the base and a second LFE 725B also has a remotely-located P2 pressure transducer 740.

Returning to FIG. 5, the second LFE 525B is configured in series with a high conductance valve 575. The high conductance valve 575 for this embodiment can be characterized by a pressure drop through the valve sufficiently small compared to a pressure drop across the second LFE 225B, such that the flow calculation error induced by ignoring the valve pressure drop is acceptably small. For example, ignoring the pressure drop a standard ¾" valve used in the industry in series with a LFE typically induces a 0.15% R error at 5,000 sccm flow of N2. It is noted that this error can be further reduced, or flow rates increased without loss of accuracy, by numerically correcting the flow calculation based on the characterization of the valve used.

This additional LFE 525B and valve are placed in parallel with the initial LFE 525A. When the high conductance valve is closed the MFC 500 has the full scale of the single initial LFE. When the high conductance valve is open, the MFC 500 has the full scale of the two LFEs 525A, 525B in parallel. By making the added LFE 525B markedly larger (i.e., much more flow at the same P1 and P2 pressures) than the initial LFE 525A, the MFC 500 will have a markedly higher full scale flow capability. Effectively, the MFC 500 has the novel aspect of operating as a high flow and a low flow MFC that shares the same inlet valve, transducers and PCB in the same package size as a current conventional MFC. The MFC 500 allows the replacement of multiple gas lines and MFCs for a single gas species, a situation commonly seen in a modern gas box, by a single gas line and MFC saving both space and cost.

The present MFC 500 meets dueling industry demands for accurate flow control and wider ranges than current MFCs can support. The O2 flow rates from 0.1 sccm to 10,000 sccm are now achievable on the same tool. Conventionally, separate O2 MFCs of different full scale values are configured to cover the desired flow range at the intended accuracy. The additional LFE 525B with the high conductance on/off valve in series can cut the number of O2 (or other gas) MFCs in half, saving space and money. While the initial LFE 525A of the pressure based MFC 500 can maintain 1% reading accuracy over a dynamic range of 20 to 1, the dual LFE operation of the MFC 500, with the proper ratio between the LFE's 525A, 525B, can maintain a 1% of reading accuracy over a dynamic range of 20×20 to 1 or 400 to 1. One of ordinary skill in the art will recognize that a dynamic range of 20 to 1 and a reading accuracy of 1% are just examples that can be varied for different implementations.

Optionally, the two LFEs 525A, 525B may be sized to focus on separate flow ranges that are not adjacent but that are further apart. For example, the smaller restrictor controlling flow accurately from 0.5 sccm to 10 sccm and the larger LFE sized to control flows from 200 sccm to 4000 when the high.

In other embodiments a third or more LFEs can be added for additional range.

Figure 6:
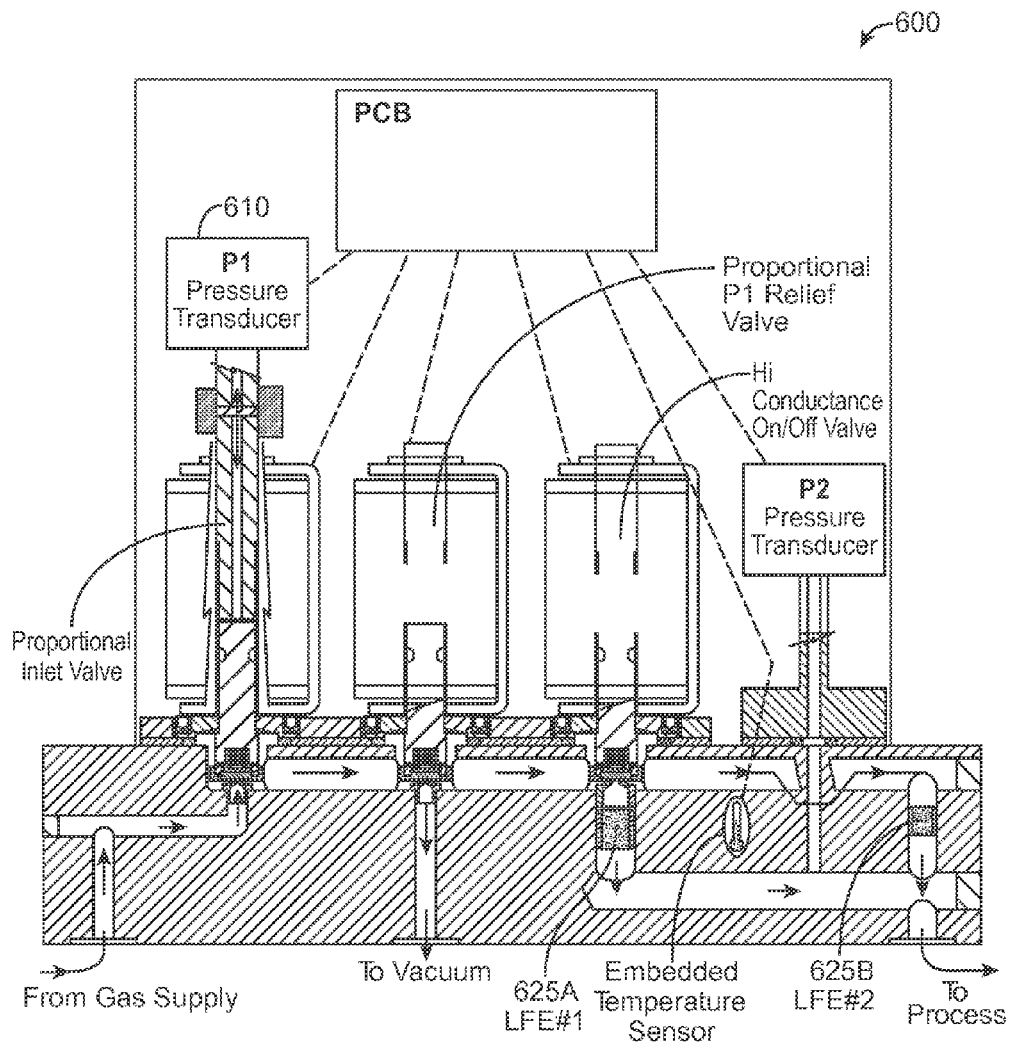
FIG. 6 is a schematic diagram illustrating a layout for a pressure based MFC with a P1 pressure transducer decoupled from a base and the second LFE, and a relief valve, according to an embodiment.

In the layout embodiment of FIG. 6, a pressure based MFC 600 with a second LFE 625B (in addition to a first LFE 625A) also includes a P1 pressure transducer 610 decoupled from the base, and a relief valve. Additionally, in the layout embodiment of FIG. 7, a pressure based MFC 700 with a second LFE 725B (in addition to a first LFE 725A) with a P1 pressure transducer decoupled and a relief also includes a P2 pressure transducer decoupled from the base and located remote to the envelope. As described above, the P2 pressure transducer can be locate downstream, for example, at a common exhaust header shared by several MFCs.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use.

The scope of the invention is defined by the following claims.

We claim:

1. A mass flow controller (MFC) for delivery of process gas, comprising:
    an enclosure attached to a base with a length;
    a conduit channeling through the base of the MFC to receive the process gas and to exhaust the process gas at a desired mass flow rate;
    a proportional inlet valve physically coupled to the base and having an input and an output to utilize conductance to control a P1 pressure of a P1 volume of the process gas,
    wherein a first pressure transducer is coupled to the proportional inlet valve without being physically coupled to the conduit in the base, and wherein a pressure of the process gas, after passing through a valve seat of proportional inlet valve, is communicated to the first pressure transducer via a hole in the proportional inlet valve;
    a restrictor coupled to the conduit of the base downstream from the proportional inlet valve;
    a second pressure transducer physically coupled to the conduit of the base downstream from the restrictor;
    an embedded temperature sensor;
    a printed circuit board (PCB) containing support electronics and software to detect and control the gas flow; and
    a relief valve to reduce bleed down time of transients between gas flows by venting at least a portion of process gas from the P1 volume;
    wherein the relief valve comprises an on/off valve with an orifice in series for bleeding off process gas from the P1 volume only when wanted.

2. The MFC of claim 1, wherein the proportional inlet valve comprises a hole drilled through a middle piece, allowing the process gas to be communicatively coupled to the first pressure transducer.

3. The MFC of claim 1, wherein the relief valve comprises a proportional-integral-derivate (PID) controlled relief valve.

4. The MFC of claim 1, further comprising:
a first laminar flow element (LFE) that maintains an accuracy of 1% over a first dynamic range; and
a second LFE in series with a valve to control activation of the second LFE, the second LFE configured in parallel to the first LFE and maintaining an accuracy of 1% over a second dynamic range.

5. A mass flow controller (MFC) for delivery of process gas, comprising:
a base, the base having an inlet and an outlet;
a conduit having sections and running along the base to receive the process gas at the inlet of the base at an initial mass flow rate and to exhaust the process gas at the outlet of the base at a desired mass flow rate;
a proportional inlet valve coupled to the base and having an input and an output to affect the process gas flowing through a first section of the conduit;
a first pressure transducer coupled to the base to monitor a pressure of the process gas flowing through a second section of the conduit;
a restrictor coupled to the conduit of the base downstream from the first pressure transducer;
an embedded temperature sensor;
a printed circuit board (PCB) containing support electronics and software to detect and control the gas flow;
a second pressure transducer configured to monitor a manifold pressure of the process gas in a manifold located downstream from the outlet of the base; and
a relief valve physically coupled to the base to reduce bleed down time of transients between gas flows by venting at least a portion of process gas at P1 pressure.

6. A mass flow controller (MFC) for delivery of process gas, comprising:
an enclosure attached to a base with a length;
a conduit channeling through the base of the MFC to receive the process gas and to exhaust the process gas at a desired mass flow rate;
a proportional inlet valve physically coupled to the base and having an input and an output to utilize conductance to control a P1 pressure of the process gas,
wherein a first pressure transducer is coupled to the proportional inlet valve without being physically coupled to the conduit in the base, wherein a pressure of the process gas is communicated to the first pressure transducer via a hole drilled through the proportional inlet valve;
a relief valve physically coupled to the base to reduce bleed down time of transients between gas flows by venting at least a portion of process gas at P1 pressure
a restrictor coupled to the conduit of the base downstream from the proportional inlet valve;
a second pressure transducer external to the enclosure and coupled to receive the process gas downstream from the MFC, wherein the second pressure transducer is accessed by more than one MFC;
a first laminar flow element (LFE) that maintains an accuracy of 1% over a first dynamic range; and
a second LFE in series with a valve to control activation of the second LFE, the second LFE configured in parallel to the first LFE and maintaining an accuracy of 1% over a second dynamic range,
an embedded temperature sensor;
a printed circuit board (PCB) containing support electronics and software to detect and control the gas flow.

7. A mass flow controller (MFC) for delivery of process gas, comprising:
an enclosure attached to a base with a length;
a conduit channeling through the base of the MFC to receive the process gas and to exhaust the process gas at a desired mass flow rate;
a proportional inlet valve physically coupled to the base and having an input and an output to utilize conductance to control a P1 pressure of a P1 volume of the process gas, a first pressure transducer physically coupled to the base downstream from the proportional inlet valve to monitor P1 pressure;
a restrictor coupled to the conduit of the base downstream from the proportional inlet valve;
a first laminar flow element (LFE) that maintains an accuracy of 1% over a first dynamic range; and
a second LFE in series with a high conductance valve to control activation of the second LFE, the second LFE configured in parallel to the first LFE and maintaining an accuracy of 1% over a second dynamic range,
a second pressure transducer physically coupled to the conduit of the base downstream from the first and second LFEs; an embedded temperature sensor; and
a printed circuit board (PCB) containing support electronics and software to detect and control the gas flow.

8. A mass flow controller (MFC) for delivery of process gas, comprising:
an enclosure attached to a base with a length;
a conduit channeling through the base of the MFC to receive the process gas and to exhaust the process gas at a desired mass flow rate;
a proportional inlet valve physically coupled to the base and having an input and an output to utilize conductance to control a P1 pressure of a P1 volume of the process gas;
a first pressure transducer physically coupled to the base downstream from the proportional inlet valve to monitor P1 pressure;
a relief valve to reduce bleed down time of transients between gas flows by venting at least a portion of process gas at P1 pressure;
a restrictor coupled to the conduit of the base downstream from the proportional inlet valve;
a second pressure transducer physically coupled to the conduit of the base downstream from the restrictor;
an embedded temperature sensor; and
a printed circuit board (PCB) containing support electronics and software to detect and control the gas flow;
wherein the relief valve is located between the restrictor and the proportional inlet valve.

9. The MFC of claim 8, wherein the relief valve comprises a PID controlled relief valve.

10. The MFC of claim 8, wherein the relief valve comprises an on/off valve with an orifice in series for bleeding off only when wanted.

11. The MFC of claim 10, wherein the relief valve is located downstream, external to the enclosure.

12. An integrated gas system (IGS)-style mass flow controller (MFC) for delivery of process gas, comprising:
- an enclosure attached to a standard MFC base;
- a conduit having sections and running along the base of the MFC to receive the process gas at an initial mass flow rate and to exhaust the process gas at a desired mass flow rate;
- a proportional inlet valve coupled to the base and having an input and an output to affect the process gas flowing through a first section of the conduit,
- wherein a first pressure transducer is coupled to the proportional inlet valve without being physically coupled to the conduit in the base, wherein a pressure of the process gas, after passing through a valve seat of proportional inlet valve, is communicated to the first pressure transducer via a hole in the proportional inlet valve;
- a restrictor coupled to the conduit of the base downstream from the first pressure transducer;
- an embedded temperature sensor;
- a printed circuit board (PCB) containing support electronics and software to detect and control the gas flow; and
- a second pressure transducer external to the enclosure and coupled to receive the process gas downstream from the MFC, wherein the second pressure transducer is accessed by more than one MFC.

13. The IGS of claim 12, further comprising:
- a venting orifice physically coupled to the base to reduce bleed down time of transients between gas flows by venting at least a portion of process gas at P1 pressure.

14. The IGS of claim 12, further comprising a shut off valve located in series with the venting orifice and downstream and external to the IGS, the venting orifice bleeding down responsive to the shut off valve being opened.

15. A mass flow controller (MFC) for delivery of process gas, comprising:
- a base having an inlet and an outlet, wherein the process gas is received at the inlet;
- a passage formed in the base and connecting the inlet and the outlet of the base;
- an inlet valve controlling the flow of the process gas through the passage;
- a first pressure transducer measuring a first pressure of the process gas at a first location in the passage, the first location being downstream from the inlet valve;
- a restrictor located in the passage and downstream from the first location;
- a relief valve or orifice located upstream of the restrictor and downstream of the inlet valve, the relief valve or orifice configured to bleed process gas from the passage.

* * * * *